Nov. 7, 1939.　　G. SCHMIEDEL　　2,179,056
HAND LANTERN
Filed March 24, 1936　　2 Sheets-Sheet 1

INVENTOR
Gustav Schmiedel
BY Conrad A. Dieterich
his ATTORNEY.

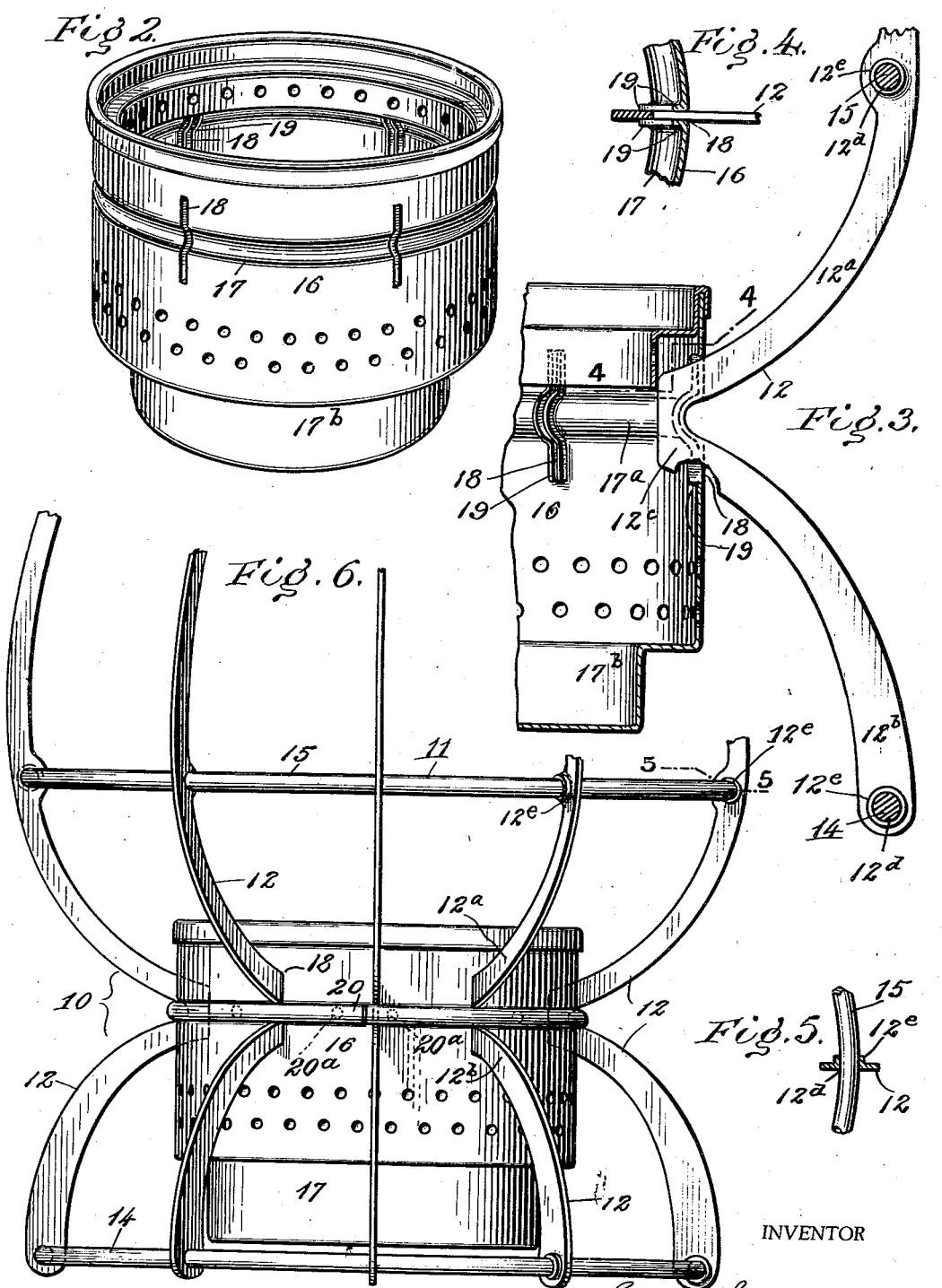

Patented Nov. 7, 1939

2,179,056

UNITED STATES PATENT OFFICE

2,179,056

HAND LANTERN

Gustave Schmiedel, Arlington, N. J., assignor to Lovell-Dressel Company, Inc., Arlington, N. J., a corporation of Maine Application March 24, 1936, Serial No. 70,585

3 Claims. (Cl. 240—40)

My invention relates to improvements in lanterns and the same has for its object more particularly the provision of a hand lantern which is simple in construction, efficient in operation, and inexpensive to manufacture.

Further, said invention has for its object the provision of a hand lantern in which the guards may be easily and rigidly secured to the oil pot holder, and to the other frame members.

Further, said invention has for its object the provision of a hand lantern with means for holding the inwardly-projecting portions of the guards, which extend into the walls of the oil pot holder, against lateral movement in relation thereto.

Further, said invention has for its object the provision of a hand lantern with means whereby the portions of the guards extending into the wall of the oil pot holder may be easily and permanently secured thereto in order to hold said guards against lateral movement.

Further, said invention has for its object the provision of a hand lantern with means whereby the portions of the guards extending through the wall of the oil pot holder may be confined and additionally secured to the oil pot holder, and the oil pot holder reinforced at the point where said portions of the guards enter the same.

Other objects will in part be obvious, and in part be pointed out hereinafter.

To the attainment of the aforesaid objects and ends, my invention consists in the novel features of construction, and in the combination, connection and arrangement of parts hereinafter more fully described and then pointed out in the claims.

In the accompanying drawings—

Fig. 2 is a perspective view of the oil pot holder detached from the frame;

Fig. 3 is an enlarged, detail vertical section;

Fig. 4 is an enlarged detail plan view partly in section of a portion of the oil pot holder and guard, and the means for holding the guard against lateral movement;

Fig. 5 is an enlarged detail sectional view on the line 5—5 of Fig. 6 showing portions of a flat vertical guard, and the wire frame member therein, and Fig. 6 is a side elevation of the lower portion of a lantern illustrating a modification.

Figure 1:
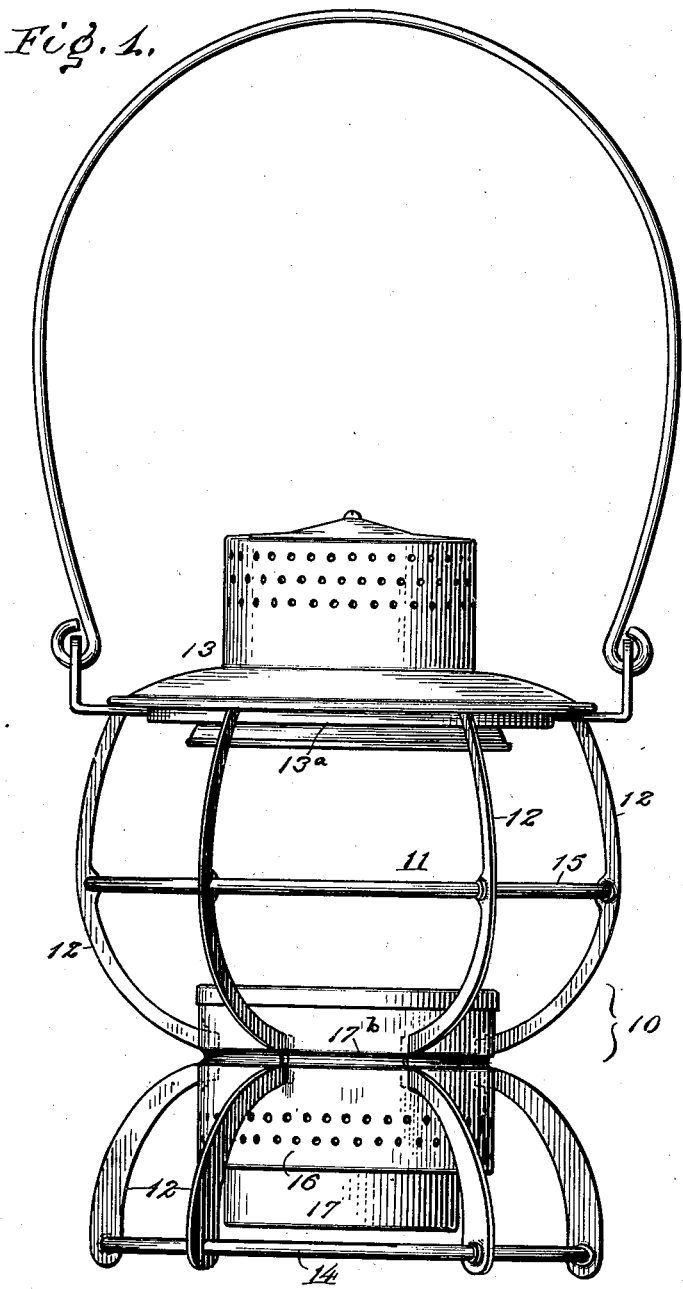
Figure 1 is a side elevation showing one form of hand lantern constructed according to, and embodying my said invention.

In said drawings 10 designates a hand lantern comprising a frame 11 composed of a series of flat vertical metal guards 12 spaced equally apart, and secured at their upper ends to an angular ring 13a of the lantern top 13 and at their lower ends to a wire ring 14. Intermediate said angular ring 13a and said wire ring 14 is a wire ring 15 which passes through suitable openings in said guards 12.

16 denotes an oil pot holder which is circular in outline, and has a reduced lower end or bottom 17 within which the oil pot of the lantern is secured. The oil pot holder 16 is provided in its side wall intermediate the top and bottom thereof, with an inwardly-extending semi-circular bead 17 forming an annular recess 17a upon the outer side of the oil pot holder. The side walls of the oil pot holder are provided with a plurality of equally-spaced relatively narrow vertical openings or slots 18 which extend through the annular bead 17, and through the portions of the side wall directly above and below said annular head or recess 17. The inner vertical edges of the side wall of the oil pot holder 16 along the opposite longitudinal edges of said openings or slots 18 are turned inwardly at substantially right angles to the inner side of the wall of the oil pot holder to form a pair of parallel vertical flanges 19, 19.

The guards 12 each comprise an upwardly and outwardly curved portion 12a, and a shorter downwardly and outwardly curved portion 12b, and at about the meeting point of said portion 12a, 12b, the guard is provided with an inwardly extending portion 12c, and in its outer side or edge, at the junction of said curved portions 12a, 12b, with a semi-circular recess which corresponds in contour with the curvature of the semi-circular recess 17a formed in the outer side of the bead 17.

The upwardly and outwardly curved portion 12a of each guard 12, and the lower end of the downwardly curved portion 12b are provided with circular apertures 12d having short annular flanges 12e along their edges to receive and hold the circular wire frame members or rings 15, 14, respectively.

In assembling the lantern frame including the top 13 and oil pot holder 16 the inwardly extending portions 12c are inserted fully within the vertical recesses 18 in the oil pot holder 16; the upper ends of said guards attached to the angular ring 13a of the top 13, and the lower ends thereof to the bottom wire ring 14, and the intermediate wire rings 15 are then passed through the flanged apertures in the flat guards 12, and the ends of said wire rings then secured together by soldering, welding or other means. Hereupon the assembled frame is dipped into molten tin or zinc in order to coat the entire structure, and thereby firmly secure the inwardly extending portions 12c of the guards 12 to the oil pot holder 16, and to the remaining frame part.

When a stronger frame is desired the oil pot holder 16 may be provided with a wire ring 20 which is disposed within the annular recess 17ᵃ in the outer side of the oil pot holder 16, and secured thereto by dipping as above described, or by spot welding 20ᵃ, soldering, or other convenient means. For convenience in securing the ring 20 in position within the annular recess 17ᵃ, the same is preferably made in two halves, and secured in position within the annular recess 17ᵃ in the oil pot holder.

The portion of the annular bead 17 projecting beyond the inner surface of the wall of the oil pot holder and the vertical inwardly extending flanges 19 serve to hold the inwardly extending portions 12c of the vertical guards 12 firmly in position within the vertical recesses or slots 18 of the oil pot holder and prevent lateral or sidewise movement thereof with respect to the oil pot holder.

Having thus described my said invention, what I claim and desire to secure by Letters Patent is:

1. A lantern comprising a frame including a plurality of flat vertical guards, each having an inwardly-projecting intermediate portion; a top, and an oil pot holder, said oil pot holder having an inwardly-extending annular bead in the wall thereof and a plurality of vertical openings therein to receive the inwardly-projecting intermediate portions of said guards, the intermediate portion of each guard having a substantially semi-circular recess in its outer edge at the junction of its members conforming to and registering with the substantially semi-circular annular bead in said oil pot holder, and means located within said annular bead and embracing the intermediate parts of said guards for securing said guards to said oil pot holder.

2. A lantern comprising a frame including a plurality of flat vertical guards, each having an inwardly-projecting intermediate portion; a top, and an oil pot holder, said oil pot holder having an inwardly-extending annular bead in the wall thereof and a plurality of vertical openings therein to receive the inwardly-projecting intermediate portions of said guards, the intermediate portion of each guard having a recess in its outer edge conforming to and registering with the said inwardly-extending annular bead, a pair of parallel inwardly-projecting vertical flanges along the longitudinal edges of each of said openings to receive therebetween the inwardly-projecting intermediate portions of said guards to hold said guards disposed therein against lateral movement, and means located within said annular bead and the conforming recesses in said guards for securing said guards to said oil pot holder.

3. A lantern comprising a frame including a plurality of flat vertical guards, each having an inwardly-projecting intermediate portion; a top, and an oil pot holder, said oil pot holder having an inwardly-extending annular bead in the wall thereof and a plurality of vertical openings therein to receive the inwardly-projecting intermediate portions of said guards, the intermediate portion of each guard having a substantially semi-circular recess in its outer edge at the junction of its members conforming to and registering with the substantially semi-circular, annular bead in said oil pot holder, a pair of parallel inwardly-projecting vertical flanges along the longitudinal edges of each of said openings to receive therebetween the inwardly-projecting intermediate portions of said guards to hold said guards disposed therein against lateral movement, and an annular member located within said annular bead and embracing the intermediate part of said guards for securing said guards to said oil pot holder.

GUSTAVE SCHMIEDEL.